United States Patent [19]

Lewis et al.

[11] Patent Number: 4,724,928
[45] Date of Patent: Feb. 16, 1988

[54] SINGLE STAGE OIL PUMP LUBRICATION SYSTEM

[75] Inventors: Russell G. Lewis; Bruce A. Fraser, both of Manlius, N.Y.

[73] Assignee: Carrier Corporation, Syracuse, N.Y.

[21] Appl. No.: 851,631

[22] Filed: Apr. 14, 1986

[51] Int. Cl.⁴ .................. F01M 9/00; B01D 19/00; B01D 47/00; F25B 43/02

[52] U.S. Cl. .................. 184/6.18; 184/6.23; 184/6.24; 55/52; 55/203; 62/84; 62/470; 210/804; 210/805

[58] Field of Search ........... 184/5.1, 6.18, 6.23, 184/6.24; 55/52, 203; 62/84, 469, 470; 415/90; 366/137; 494/35; 210/804, 805

[56] References Cited

U.S. PATENT DOCUMENTS

| | | | |
|---|---|---|---|
| 2,418,962 | 4/1947 | Zwickl | 62/470 |
| 3,021,689 | 2/1962 | Miller | 62/84 |
| 3,200,603 | 8/1965 | Wake | 62/84 |
| 3,299,655 | 1/1967 | Rayner | 62/469 |
| 3,408,828 | 11/1968 | Soumerai | 62/470 |
| 3,830,341 | 8/1974 | Davies | 184/6.18 |
| 3,948,354 | 4/1976 | Fosse et al. | 184/6.22 |
| 4,063,853 | 12/1977 | De Groat | 417/368 |
| 4,131,396 | 12/1978 | Privon | 184/6.18 |
| 4,153,392 | 5/1979 | Elson | 184/6.18 |

Primary Examiner—Leonard E. Smith
Assistant Examiner—Jane E. Obee
Attorney, Agent, or Firm—David J. Zobkiw

[57] ABSTRACT

Oil normally having refrigerant gas entrained therein is drawn from a sump. A portion of the oil is returned to the sump to agitate the oil in the sump to enhance gas separation therefrom. The remainder of the oil is subjected to centrifugal separation to remove the entrained refrigerant. The separated refrigerant is vented while the separated oil is fed to the lubrication system where contaminant removal takes place.

4 Claims, 7 Drawing Figures

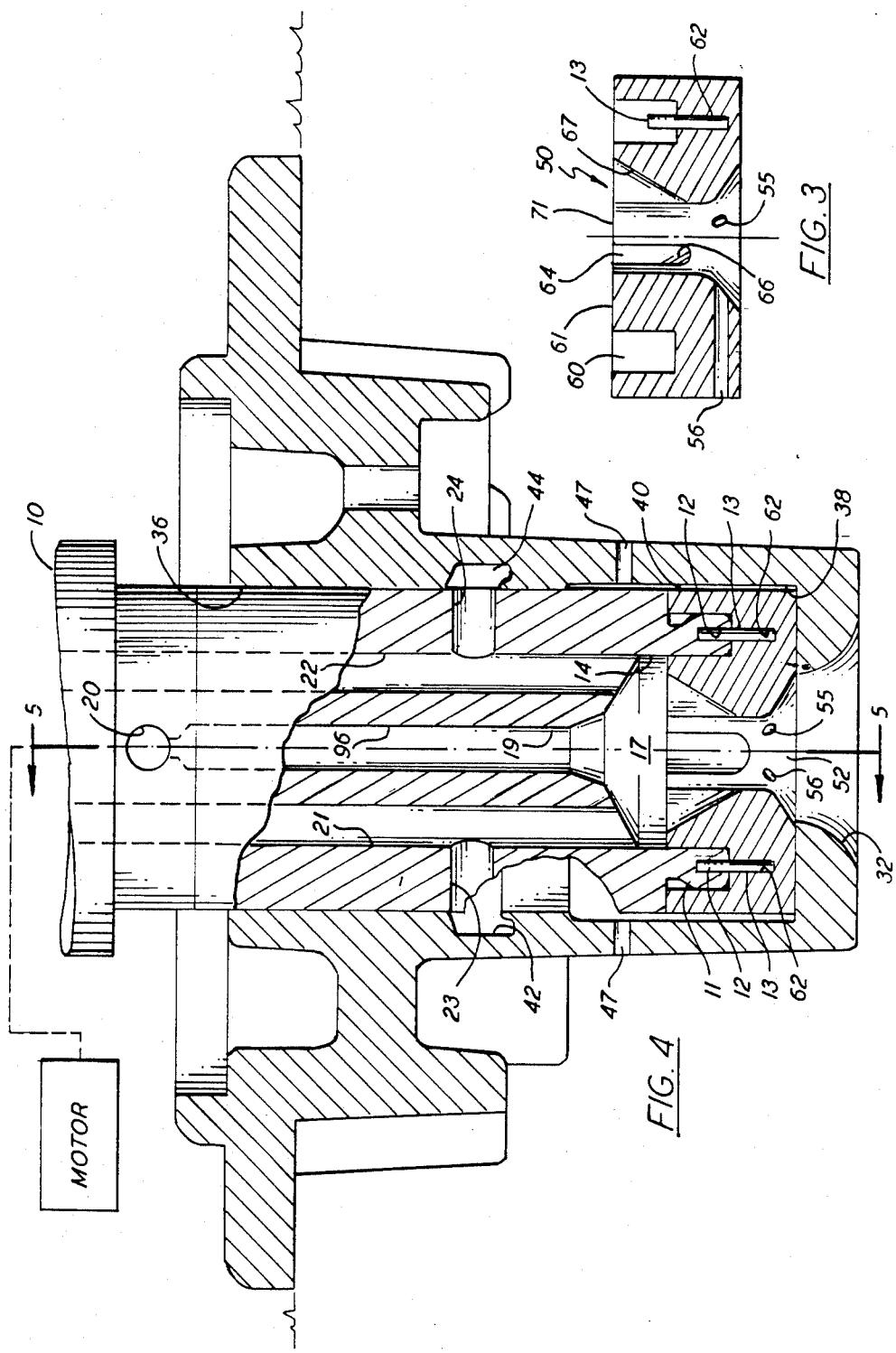

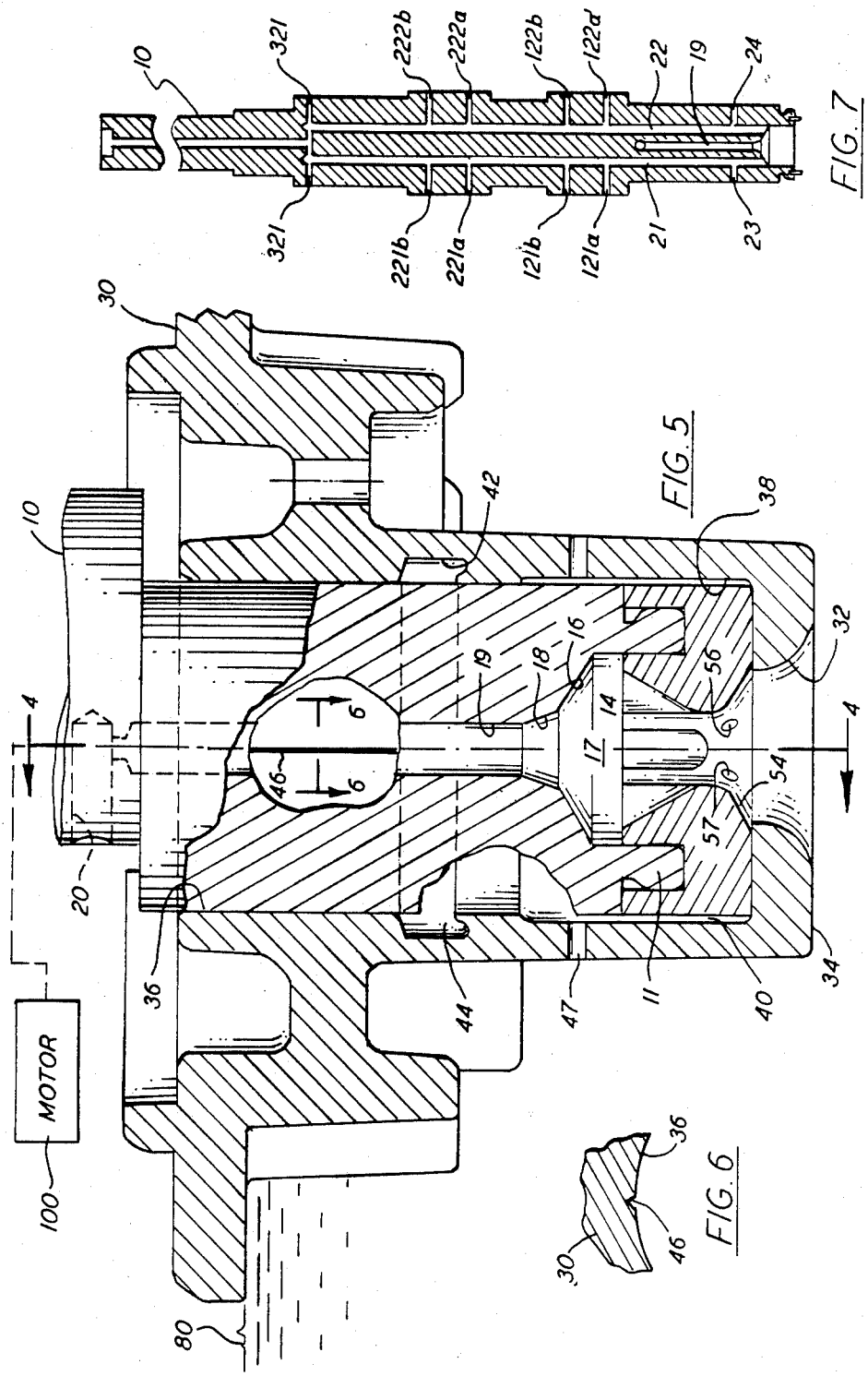

SINGLE STAGE OIL PUMP LUBRICATION SYSTEM

BACKGROUND OF THE INVENTION

In hermetic compressor units, oil is drawn from a sump by a lubrication pump to provide lubrication to the compressor. The compressor operation takes place over a range of conditions including transient conditions such as suction pressure drop at start up, shell pressure equalization, flooded start up, ambient swings and unit control changes. These transient conditions are often out of the range of normal steady-state operating conditions and can have serious consequences even though the transient conditions do not themselves persist. For example, the oil normally contains entrained refrigerant so that, if there is a sudden pressure drop at the suction inlet of the oil pump, a great deal of foaming and outgassing of the entrained refrigerant can take place. As a result, foam can be delivered to the lubrication system and the gaseous refrigerant can persist in the lubrication system thereby causing improper and/or inadequate lubrication.

SUMMARY OF THE INVENTION

The present invention is directed to a single stage centrifugal oil pump system having a streamlined flow pattern through the pump system. Four small pumps, which are located upstream of the main lubrication system, enhance separation of refrigerant gas from the oil in the sump through agitation caused by returning the pumped fluid back to the sump through a series of small orifices. Four paddles are located downstream of the four pumps and provide a positive centrifugal action and refrigerant gas separation from the oil flow even in the presence of foam. Separated refrigerant gas and oil pass upwardly through separate passages in the vertically oriented crankshaft. Refrigerant gas flows upwardly through a hole in the center of the shaft which is coaxial with the axis of rotation of the shaft and leads to a horizontal passage exiting from the shaft. Oil is delivered up the shaft through two eccentric feed holes which are diametrically oppositely located. Horizontal passages extend from each eccentric oil feed passage to permit oil flow to the lower main bearing, each eccentric strap, and to the upper main bearing. The passage to the lower main bearing provides the first division of the separated oil flow so that the horizontal passage for lubricating the lower main bearing leads to an annular chamber for collecting contaminants contained in the oil before the oil is circulated for lubrication of the lower main bearing and recirculated throughout the entire system. An axially extending groove is formed in the lower main bearing to permit the passage of oil and contaminants entrained in the flow through the groove back to the oil sump.

It is an object of this invention to provide an adequate oil flow with a minimum amount of entrained refrigerant gas to the main bearing and eccentric bearing journals in a reciprocating compressor.

It is another object of this invention to provide adequate oil flow with a minimum amount of entrained refrigerant gas under transient operating conditions.

It is a further object of this invention to provide unqualified venting and gas/oil separation. These objects, and others as will become apparent hereinafter, are accomplished by the present invention.

Basically, the present invention provides a streamlined flow pattern and divides the oil flow such that a first portion is returned to the sump to enhance gas/oil separation and homogeneity through agitation outside of the main lubrication system. The second portion of the oil flow is subjected to centrifugal separation permitting the unqualified venting of the gas while the separated oil is supplied for lubrication to the upper and lower bearings and piston straps. The first lubrication flow is to the lower main bearing via a radial feed hole and a contamination collection chamber.

BRIEF DESCRIPTION OF THE DRAWINGS

For a fuller understanding of the present invention, reference should now be made to the following detailed description thereof taken in conjunction with the accompanying drawings wherein:

FIG. 3 is a sectional view taken along a line 3—3 of FIG. 2;

FIG. 4 is a partial sectional view of the lower portion of the lubrication system taken along line 4—4 of FIG. 5;

FIG. 5 is a partial sectional view of the lower portion of the lubrication system taken along line 5—5 of FIG. 4;

FIG. 6 is a partial sectional view taken along line 6—6 of FIG. 5; and

FIG. 7 is a sectional view of the crankshaft taken along line 4—4 of FIG. 5.

DESCRIPTION OF THE PREFERRED EMBODIMENT

Figure 2:
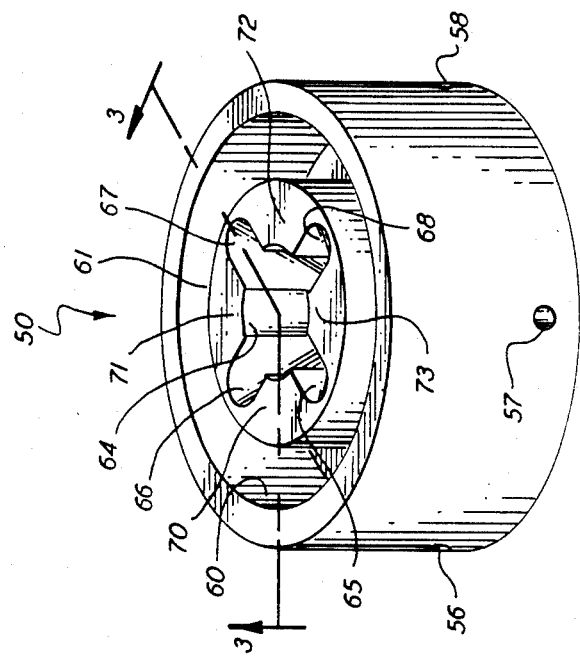
FIG. 2 is a pictorial view of the pump from the top.
Figure 1:
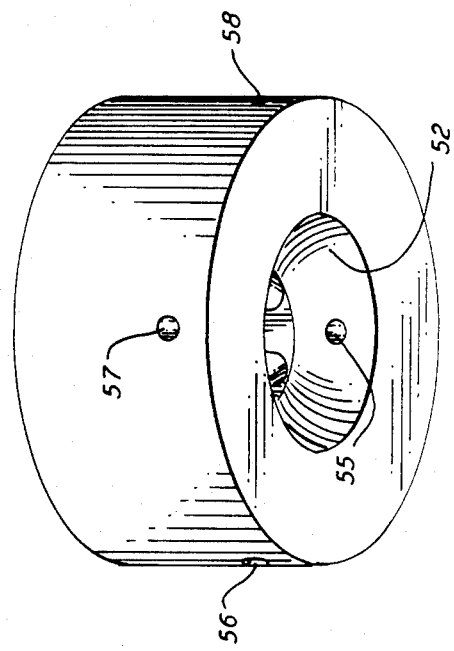
FIG. 1 is a pictorial view of the pump structure looking into the inlet.

In FIGS. 1-3 the numeral 50 generally designates the pump structure. As best shown in FIG. 3, the inlet passage 52 of the pump structure is of a streamlined configuration and converges in a downstream direction to a throat 54. At a point upstream of the throat 54, four equally spaced, radially extending passages 55-58 are located in a common plane and extend from the inlet passage 52 through the pump structure 50 to define four small pumps. An annular recess 60 is formed in the top or downstream portion of the pump structure 50, as is best shown in FIG. 2, and surrounds a raised portion 61. Two diametrically spaced, axially extending pin receiving bores 62 are formed in the bottom of annular recess 60 as is illustrated in FIGS. 3 and 4.

Referring now specifically to FIGS. 2-5, bore 64 forms a continuation of the throat 54 but the flow path downstream of throat 54 diverges due to the diverging slots 65-68 originating at, or just downstream of the throat 54. Slots 65-68 are located 90° apart and are preferably displaced 45° from the passages 55-58. Slots 65-68 are separated by raised portions 70-73 which define paddles. The paddles 70-73 provide a positive centrifugal action and gas removal.

Crankshaft 10 is driven by motor 100 and has an axially extending annular ridge 11 which is complementarily received in annular recess 60 of pump structure 50. Two axial pin bores 12 corresponding to bores 62 are formed in ridge 11. Pins 13 are received in bores 12 and 62 to provide a driving connection between crankshaft 10 and pump structure 50 which are supported by end wall 34 of lower main bearing 30. A vertical bore coaxial with the axis of rotation is formed in crankshaft 10 and includes a first bore portion 14 for receiving raised portion 61 and defining together with bore portion 16 a chamber 17 for centrifugally separating the refrigerant gas and oil. Bore portion 16 transitions through bore portion 18 to bore portion 19 which extends part way up crankshaft 10 to a radial pasage 20 which extends to the exterior of the crankshaft 10 and serves to vent refrigerant gas. Bores 21 and 22, as best shown in FIGS. 4 and 7, are diametrically spaced and extend from bore portion 16, through crankshaft 10 in parallel with bore portion 19. A plurality of axially spaced horizontal passages extend from bores 21 and 22 to the exterior of crankshaft 10 to feed lubricant to the lower main bearing, each of the eccentric straps and the upper main bearing. Specifically, passages 23 and 24 feed lubricant to the lower main bearing 30, passages 121a and b, 122a and b, 221a and b and 222a and b feed lubricant to the eccentric straps, and passages 321 and 322 feed lubricant to the upper main bearing.

Lower main bearing 30 has an inlet 32 having a streamlined converging configuration formed in end wall 34 and providing a continuous fluid path with inlet passage 52 in the assembled device. A bore 36 is formed in bearing 30 and has a first relieved annular portion 38 defining together with crankshaft 10 and pump structure 50 an annular chamber 40 and a second relieved annular portion 42 defining together with crankshaft 10 an annular contamination collection chamber 44. An axial groove 46 is formed in the wall of bore 36 and extends from relieved annular portion 42 to the top of lower main bearing 30. A plurality of horizontal bores 47 extend through lower main bearing 30 in the first relieved annular portion 38.

With the parts assembled as shown in FIGS. 4 and 5 and with lower main bearing 30 extending beneath the oil level 80 of the oil sump at least to the extent that bores 47 are beneath the oil, the operation would be as follows. The motor 100 causes rotation of the crankshaft 10 which, through pins 16, causes the rotation of pump structure 50 therewith as a unit. Rotation of pump structure 50 creates a pressure differential across passages 55–58 which causes them to act as pumps whereby oil is drawn through inlet 32 into inlet passage 52 whereupon a portion of the oil enters passages 55–58 and is forced therefrom into annular chamber 40 causing a flow from chamber 40 through bores 47 back to the sump where it causes agitation which enhances gas/oil separation prior to the delivery of the oil to the main lubrication system. The remainder of the oil reaching inlet passage 52 passes through throat 54 into bore 64 where paddles 70–73 provide a positive centrifugal action which removes the refrigerant gas from the oil even in the presence of foam as well as providing a pumping action. The separation of oil and refrigerant gas takes place in bore 64 and chamber 17 where centrifugal forces act to move the oil radially outward while having no significant effect on the gas. The oil, therefore, moves radially outward then axially up the bores 21 and 22. The separated gas passes up bore 19. The oil passing upwardly in bores 21 and 22 first encounters passages 23 and 24 whereupon a portion of the oil is forced radially outward into annular chamber 44. Because they are affected by the centrifugal forces, any contaminants tend to be entrained in the oil passing into passages 23 and 24. The oil entering annular chamber 44 thus, may contain contaminants which will tend to settle to the bottom of annular chamber 44. Oil and contaminants entrained in the oil leave annular chamber 44 via axial groove 46 which extends above oil level 80.

The oil in the axial groove 46 lubricates the rotating portion of crankshaft 10 which together with groove 46 defines an oil passage. Oil flowing through groove 46 returns to the oil sump via gravity. Oil flowing through bores 21 and 22 beyond passages 23 and 24 serially encounter corresponding horizontal passages 121a and b, 122a and b, 221a and b and 222a and b for feeding lubricant to the piston straps and passages 321 and 322 for feeding lubricant to the upper main bearing before returning to the sump via gravity.

Although a preferred embodiment of the present invention has been illustrated and described other modifications will occur to those skilled in the art. It is therefore intended that the present invention is to be limited only by the scope of the appended claims.

What is claimed is:

1. A method for providing gas/oil separation in a lubrication system comprising the steps of:
    withdrawing oil normally containing entrained refrigerant gas from a sump;
    pumping a portion of the withdrawn oil back to the sump to agitate the oil in the sump to enhance gas/oil separation in the sump;
    subjecting the remaining withdrawn oil to centrifugal separation to separate the oil and entrained refrigerant gas;
    venting the separated refrigerant gas;
    delivering the separated oil to the oil delivery system;
    dividing the delivered oil into a plurality of flows;
    distributing each of the plurality of flows to parts requiring lubrication; and
    passing one of the plurality of flows through a contaminant removal means prior to distributing the one flow to the corresponding parts requiring lubrication.

2. The method of claim 1 wherein the contaminant removal means is an annular chamber defined by a stationary part and a rotating part requiring lubrication with an axial groove formed in the stationary part whereby oil is distributed to the stationary part and the rotating part over 360° and any contaminants entrained in the oil can pass through the axial groove.

3. A lubrication system comprising:
    an oil sump having therein oil normally containing entrained refrigerant;
    a lower bearing member partially extending into said oil sump and having a first and a second end with an end wall at said first end, an inlet extending through said end wall, an axial bearing bore extending from said second end to said end wall, said bearing bore defining a first relieved annular portion adjacent said end wall and a second relieved annular portion axially spaced from, said first relieved portion, an axially extending groove formed in said bearing bore between said second relieved portion and said second end, and a plurality of radial outlet passages extending outwardly from said first relieved portion at a point beneath the surface of said oil in said sump;
    pump means supported within said bearing bore by said end wall and having a converging inlet continuous with said inlet in said end wall and a pump bore extending through said pump means continuous with said converging inlet and defining a throat;
    a plurality of radially extending bores formed in said pump means in said converging inlet upstream of said throat and extending from said converging inlet to an annular chamber defined by said pump means and said first relieved annular portion;

a plurality of radial slots in said pump means extending from said pump bore from a point downstream of said throat and radially increasing with distance from said throat and defining a plurality of paddles between said slots;

a crankshaft means having an end portion within said bearing bore and having a first bore portion which coacts with said pump means to define a centrifugal separation chamber, a second bore portion defining a gas vent passage in fluid communication with said separation chamber and extending axially in said crankshaft means to a point beyond said second end and connecting with a radial vent passage in said crankshaft means, a pair of axially extending passages in said crankshaft means radially spaced from and on opposite sides of said second bore portion;

a plurality of pairs of radially extending passages in said crankshaft means communicating with respective ones of said pair of axially extending passages with one pair of said plurality of pairs of radially extending passages communicating with a chamber defined by said second relieved portion and said crankshaft means;

means for drivingly connecting said pump means and said crankshaft means; and means for rotating said crankshaft means and thereby said pump means.

4. The lubrication system of claim 3 wherein said crankshaft means is rotated about an axis which is coaxial with said second bore portion in said crankshaft.

* * * * *